(12) United States Patent
Domen et al.

(10) Patent No.: US 6,864,211 B2
(45) Date of Patent: Mar. 8, 2005

(54) PHOTOCATALYSTS FOR DECOMPOSITION OF WATER BY VISIBLE LIGHT

(75) Inventors: Kazunari Domen, Kanagawa (JP); Michikazu Hara, Kanagawa (JP); Tsuyoshi Takata, Kanagawa (JP); Go Hitoki, Kanagawa (JP)

(73) Assignee: Japan Science and Technology Agency, Kawaguchi (JP)

( * ) Notice: Subject to any disclaimer, the term of this patent is extended or adjusted under 35 U.S.C. 154(b) by 0 days.

(21) Appl. No.: 10/399,501

(22) PCT Filed: Nov. 14, 2001

(86) PCT No.: PCT/JP01/09952

§ 371 (c)(1),
(2), (4) Date: Apr. 17, 2003

(87) PCT Pub. No.: WO02/062470

PCT Pub. Date: Aug. 15, 2002

(65) Prior Publication Data

US 2004/0118785 A1 Jun. 24, 2004

(30) Foreign Application Priority Data

Feb. 7, 2001 (JP) .......................... 2001-030627

(51) Int. Cl.[7] .............................................. B01J 27/24
(52) U.S. Cl. ....................................... 502/200; 423/351
(58) Field of Search ........................... 502/200; 423/351

(56) References Cited

PUBLICATIONS

Yoshinao, English abstract of JP 59–203701, Nov. 1984.*

Kazuhiro et al., English abstract of JP 09–075745, Mar. 1997.*

Masao et al., English abstract of JP 05–193902, Aug. 1993.*

* cited by examiner

*Primary Examiner*—Elizabeth D. Wood

(57) ABSTRACT

A photocatalyst which contains at least rhombic tantalum nitride or consists of rhombic tantalum nitride. A photocatalyst wherein said photocatalyst loads a promoter composed of transition metal, in particular, the photocatalyst wherein a transition metal is platinum, further the photocatalyst for decomposition of water comprising any of these photocatalysts.

6 Claims, 5 Drawing Sheets

$2\theta$ (°)

wave length/nm

Nitriding (calcination) time
in ammonia gas/hr

PHOTOCATALYSTS FOR DECOMPOSITION OF WATER BY VISIBLE LIGHT

CROSS REFERENCE TO RELATED APPLICATION

This application is a 371 application of PCT/JP01/09952 filed on Nov. 14, 2001, which claims foreign priority to JP 2001-30627 filed on Feb. 7, 2001.

FIELD OF THE INVENTION

The present invention relates to a novel photocatalyst. Namely, this invention relates to a photocatalyst which contains at least rhombic tantalum nitride, particularly, a visible-light active photocatalyst consisting of rhombic tantalum nitride and a photocatalyst for the water-splitting.

BACKGROUND OF THE INVENTION

The following photocatalytic reaction is well-known as a technique to obtain an aimed subject. That is, the light is irradiated to a solid compound which has a photocatalytic function so as to generate exited electrons and holes. Then a substance is oxidized or reduced by said exited electrons and holes and obtain the aimed object.

In particular, photocatalytic decomposition of water, is interested in from the view point of photo energy transformation. Further, a photocatalyst which shows activity to the photo decomposing reaction of water can be recognized as an excellent photo functional material which provides function such as photo absorption, electrolytic separation or oxidation-reduction reaction at the surface.

Kudo, Kato et al, are explaining that alkaline tantalate or alkaline earth element is a photocatalyst which shows excellent activity to the stoichiometric photocatalytic decomposing reaction of water by quoting various prior arts [for example, Catal. Lett., 58(1999), 153–155; Chem. Lett., (1999), 1207; Surface, Vol.36, No.12 (1998), 625–645 (hereinafter shortened to Document A)]. In above mentioned Document A, there is an explanation about an useful photocatalytic materials for proceeding the decomposing reaction of water to hydrogen and/or oxygen using a photocatalyst, and many indications about photocatalyst used for stoichiometric photocatalytic decomposing reaction of water are mentioned.

Further, a photocatalyst which loads a promoter such as platinum or NiO is referred.

However, the photocatalysts explained in these documents are mainly the compound containing oxygen as a non-metallic element and a transition metal such as Ta, Nb and Ti as a metal. And in the cases of various solid photocatalyst, since the width of a forbidden band exists between a valence electron band and a conduction band, that is, band gap energy is larger than 3 eV, it is difficult to excite it by low energy under 3 eV, namely it is difficult to generate electrons and positive holes by light. On the contrary, almost all of the conventional solid photocatalyst which can generate electrons and holes by visible-light irradiation are unstable under the condition of photocatalytic water decomposing reaction. For example, the band gap energy of CdS or Cu—ZnS is 2.4 eV, but the catalytic reaction is restricted because it is affected by photo-corrosive action, which is corrosive oxidative action. In the meanwhile, almost all of the solar light which reaches to the surface of the earth is the visible light radiation of lower energy. Therefore, for the purpose to progress various photocatalytic reactions effectively, a stable photocatalyst which acts by visible light is needed. However, among the conventional technique, there is no technique to satisfy the above mentioned requirement.

The U.V.(ultra violet).visible light absorption spectrum of cadmium sulfide CdS on the market (99.99% purity) is already measured and it is known that it absorbs the light of spectrum region from ultra violet to visible light of 550 nm. Further, according to the reports of many researchers, in the case of CdS, since a valence electron band and a conduction band, which forms band gap 2.4 eV, has surplus to generate oxygen and hydrogen by electric potential view, theoretically it is deemed to have an ability to decompose water to hydrogen and oxygen. However, there is a report which reports that when decomposing reaction of water is carried out by irradiating visible light over than 440 nm, hydrogen can be obtained stable, but the generation of oxygen can not be observed at all. This phenomenon can be explained as follows. That is, photo dissolution of catalyst itself, in other word, photo-corrosive action is caused because of instability of chemical species on catalyst surface and when a positive hole in the inside of solid generated by photo excitation is transferred to the surface, it oxidizes a $S^{2-}$ on the surface prior to a water molecule and forms a surface From the above mentioned fact, it is obviously known that the pure sulfide CdS can reduce protons to hydrogen by visible light having longer wavelength than 440 nm, but is not so stable material to generate oxygen from water and does not have such an ability.

The inventors of the present invention have conjectured that since a valence electron of a nitrogen atom has higher energy than that of oxygen atom, a band gap energy of metal compound containing nitrogen atom can be make smaller than that of metal oxide, and considered that a metal and a metal compound bonded with adequate amount of nitrogen atoms become possible to generate excitation electrons and holes and will become a photocatalyst which acts by visible light irradiation. And the inventor of the present invention synthesized oxynitride containing a transition metal and proposed a photocatalyst which acts by visible light (refer to JP Application 2000-256681 published as unexamined application JPA 2002-066333 on May 3, 2002).

The object of the present invention is to provide a novel photocatalyst which acts at broad wave length region of visible light. The inventors of the present invention have further proceeded an idea of above mentioned oxynitride containing transition metal, and think of that a photocatalyst which acts by visible light can be obtained from a compound wherein transition metal is bonded with nitrogen alone. Therefore, the inventors of the present invention have concentrated in the investigation for the synthesis of stable transition metal nitride, and have found out that the compound containing rhombic tantalum nitride of characterizable by chemical formula $Ta_3N_5$ can be used in stable as a photocatalyst. Thus the object of the present invention is accomplished. The compound containing rhombic tantalum nitride means that the compound is not necessary to be a pure rhombic tantalum nitride but is sufficient if the diffraction spectrum of tantalum nitride is detected by an X-ray diffraction.

DISCLOSURE OF THE INVENTION

The first one of the present invention relates to a photocatalyst which contains at least rhombic tantalum nitride. Desirably, the first one of the present invention is the photocatalyst containing at least rhombic tantalum nitride which loads a promoter made of transition metal, and more desirably, the promoter being loaded on said photocatalyst containing at least rhombic tantalum nitride is platinum.

The second one of the present invention is a photocatalyst comprising rhombic tantalum nitride. Desirably, the second one of the present invention is the photocatalyst comprising rhombic tantalum nitride which loads a promoter made of transition metal, and more desirably, the promoter being loaded on said photocatalyst comprising rhombic tantalum nitride is platinum.

The third one of the present invention is a photocatalyst for decomposition of water comprising the photocatalyst of the first and second inventions.

BRIEF ILLUSTRATION OF THE DRAWINGS

Figure 3:
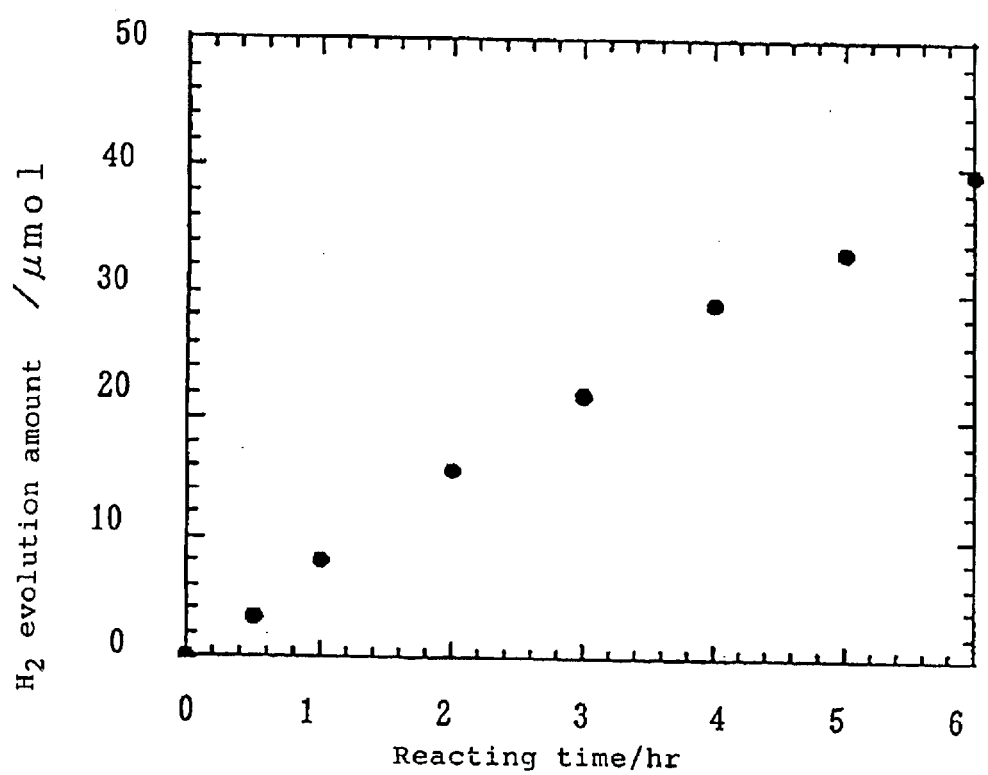

FIG. 3 is a graph showing hydrogen evolution rate by irradiating the visible-light longer than 420 nm using 1 wt % Pt promoter loaded $Ta_3N_5$ as a photocatalyst to 0.200 $dm^3$ of aqueous solution of 10 vol % methanol in which 0.2 g of said catalyst is suspended.

Figure 4:
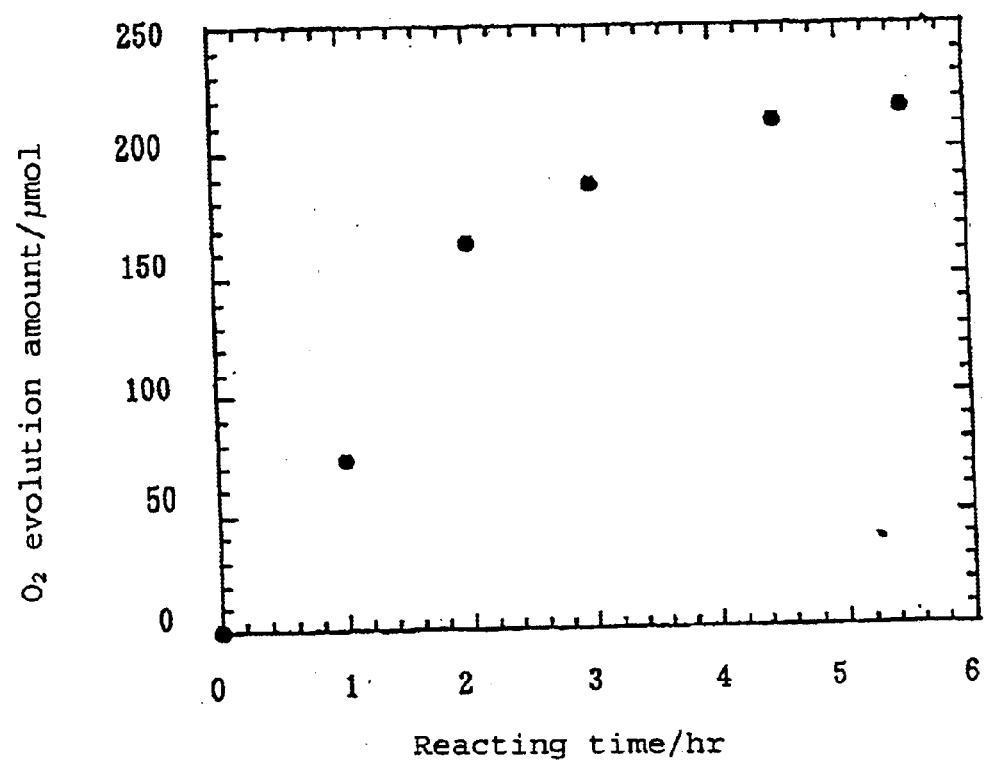

FIG. 4 is a graph showing oxygen evolution rate by irradiating the visible-light longer than 420 nm using 1 wt % Pt promoter loaded $Ta_3N_5$ as a photocatalyst to 0.200 $dm^3$ of aqueous solution of 0.01 mol/$dm^3$ $AgNO_3$ in which 0.2 g of said catalyst is suspended.

Figure 5:
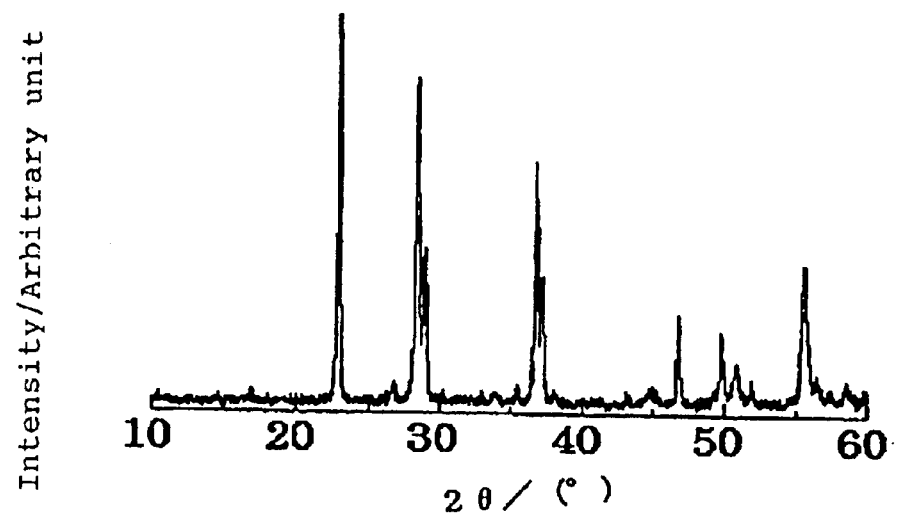

FIG. 5 is a graph showing the X-ray diffraction pattern of $Ta_2O_5$, which is the starting material of photocatalyst of the present invention.

Figure 6:
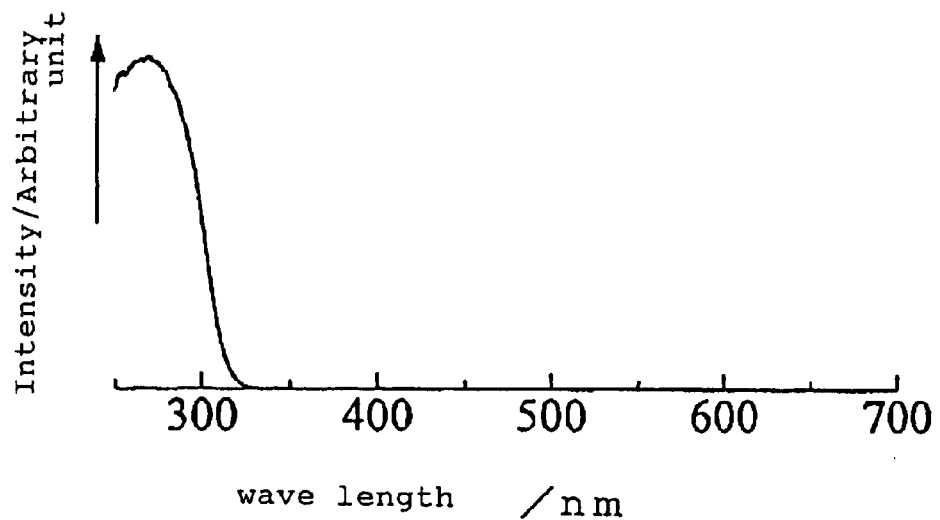

FIG. 6 is a graph showing the U.V..visible light diffuse reflectance spectrum of photocatalyst $Ta_2O_5$, which is the starting material of photocatalyst of the present invention.

Figure 7:
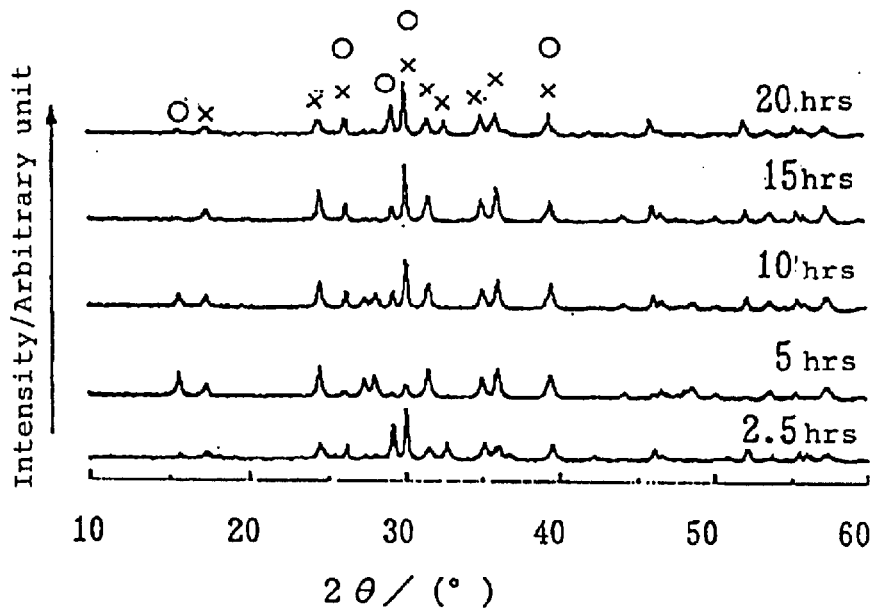

FIG. 7 is a graph showing the X-ray diffraction pattern of the mixed powder of $Ta_2O_5$ and $La_2O_3$ which is calcined under ammonia gas flow for 2.5–20 hours.

Figure 8:
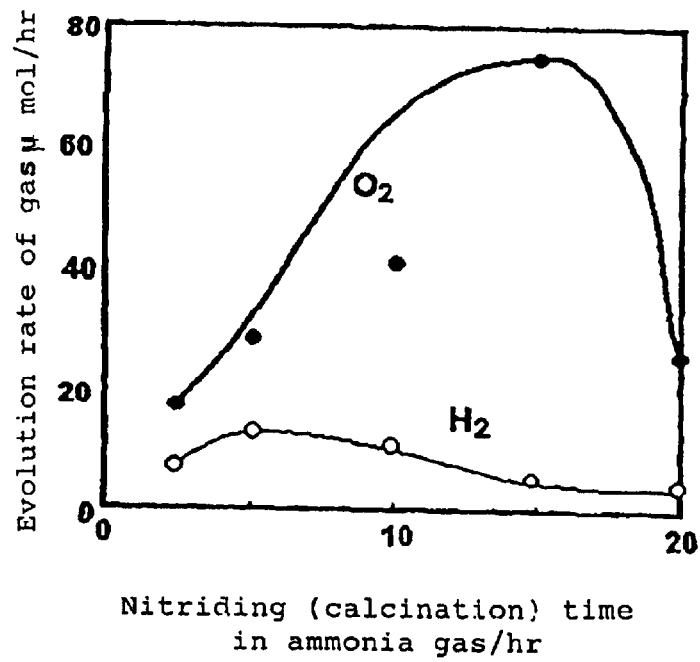

FIG. 8 is a graph showing hydrogen and oxygen evolution rate by irradiating the visible light longer than 420 nm using 1 wt % Pt promoter loaded calcined mixed powder of FIG. 7 as a visible light photocatalyst to 0.200 $dm^3$ of aqueous solution of 10 vol % methanol in which 0.2 g of said catalyst is suspended and to 0.200 $dm^3$ of aqueous solution of 0.01 mol/$dm^3$ $AgNO_3$ in which 0.2 g of said catalyst is suspended.

THE BEST EMBODIMENT TO CARRY OUT THE INVENTION

The present invention will be illustrated more in details.

A. Tantalum nitride $Ta_3N_5$ which has photocatalytic function at visible light of the present invention can be synthesized by the reaction of tantalum compound and nitrogen containing compound. As the starting material of said tantalum compound, tantalum oxide, tantalum halide, tantalate or tantalum complex are used. Tantalum nitride which has photocatalytic function at visible light of the present invention can be synthesized by reacting above mentioned starting material for tantalum compound or the mixture of said starting material for tantalum compound with other metal oxide, metal halide or metallic salt with ammonia, metallic amide or complex of metallic amine.

Especially, the reaction of tantalum oxide with ammonia is advantageous for the synthesis method of photocatalyst of the present invention. In this reaction, ammonia acts as a reducing agent and also as a nitriding agent.

The flow rate of ammonia depends on the reacting temperature. That is, when the temperature is high, the supplying speed becomes fast. The reacting temperature is within the limit of 400° C.–1200° C. (673–1473K).

B. The tantalum nitride obtained by above mentioned calcinating (nitriding) process, the catalyst activity of it can be improve by adding a promoter.

As the promoter, transition metal or transition metal compound, for example, platinum (Pt), nickel oxide (NiO) can be mentioned. The adding amount of the promoter to the catalyst is within the limit from 0.1 wt % to 10 wt %.

As the method for adding of the promoter, a conventional adding method of the promoter to the photocatalyst can be used. For example, in the case of Pt, aqueous solution of tetraamminedichloroplatinum [$Pt(NH_3)_4Cl_2$] is penetrated into catalyst and dried, then reduced by hydrogen, thus Pt can be added.

EXAMPLES

The present invention will be illustrated more in details according to the Examples. However, following Examples are mentioned for the purpose to clearly explain the usefulness of the present invention and not to intending to limit the scope of the present invention.

Example 1

Tantalum oxide $Ta_2O_5$ (1.00 g) is heated to 850° C. (1123K) by 10° C. (10K)/minute temperature elevating rate and maintain this temperature for 25 hours under the ammonia $NH_3$ flow rate of 1 $dm^3$/min., then quenched to the room temperature under He gas flow. Thus, $Ta_3N_5$ material is synthesized. Platinum, which is a promoter, is added by following process. That is, aqueous solution of tetraamminedichloroplatinum $Pt(NH_3)_4Cl_2$ is impregnated into obtained $Ta_3N_5$ material on a water bath and water is evaporated. Then reduced by hydrogen gas at 300° C. (573K) for 2 hours. The impregnating amount of the promoter can be altered within the limit of 0.1–10 wt %.

Figure 1:
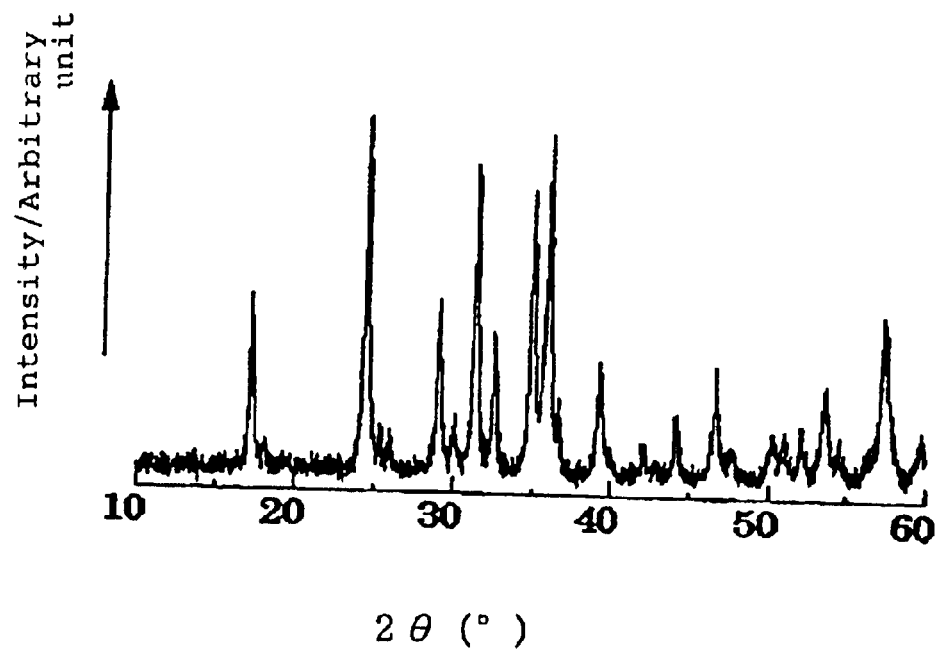
FIG. 1 is a graph showing the X-ray diffraction pattern of visible light photocatalyst $Ta_3N_5$ of the present invention.
Figure 2:
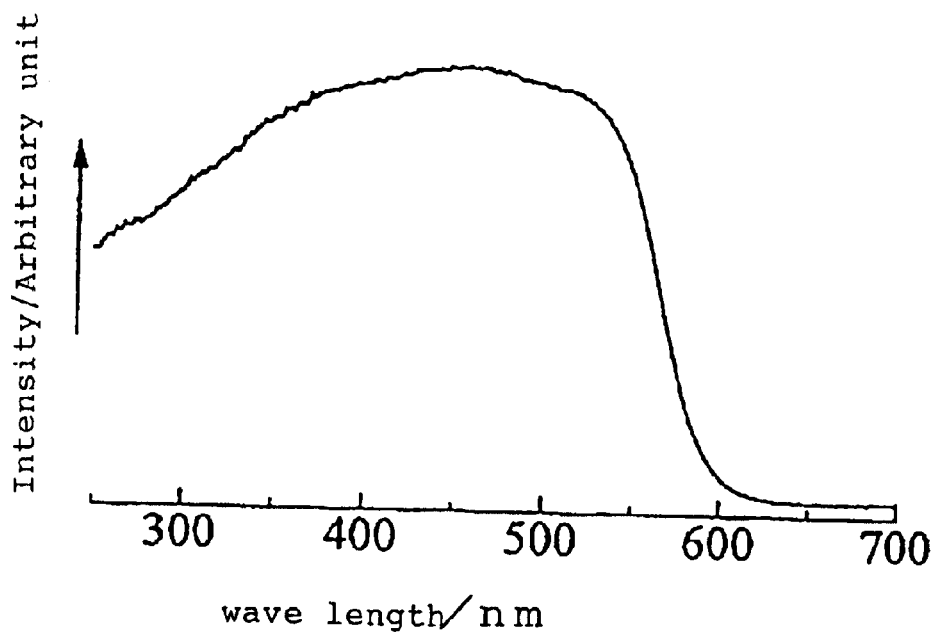
FIG. 2 is a graph showing the U.V..visible light diffuse reflectance spectrum of $Ta_3N_5$ of the present invention.

The X-ray diffraction pattern of calcined $Ta_3N_5$ material is shown in FIG. 1. All the diffraction peaks in FIG. 1 are assigned to those of $Ta_3N_5$ and the generation of rhombic $Ta_3N_5$ is recognized. That is, it is recognized that the obtained product is composed of $Ta_3N_5$ on which Pt promoter is loaded. U.V..visible light diffuse reflectance spectrum of said material is shown in FIG. 2. It is obvious from FIG. 2 that the above material absorbs the visible light of shorter wavelength than 620 nm. In FIG. 3, hydrogen evolution rate by irradiating the visible light longer than 420 nm using 1 wt % Pt promoter loaded $Ta_3N_5$ as a visible light photocatalyst to 0.200 $dm^3$ of aqueous solution of 10 vol. % methanol in which 0.2 g of said catalyst is suspended is shown. As the light source, 500W xenon lamp is used, and visible light of longer wavelength than 420 nm is irradiated by using a wavelength filter which cut off the light of shorter wavelength than 420 nm. As shown in FIG. 3, it become clear that above mentioned catalyst can generate hydrogen constantly from aqueous solution of methanol under the irradiation of visible light of longer wavelength than 420 nm. In FIG. 4, oxygen evolution rate by irradiating the visible light of longer wavelength than 420 nm using 1 wt % Pt promoter loaded $Ta_3N_5$ as a visible light photocatalyst to 0.200 $dm^3$ of aqueous solution of 0.01 mol/$dm^3$ $AgNO_3$ in which 0.2 g of said catalyst is suspended is shown. The reaction is carried out by the same condition to above mentioned hydrogen generating experiment. As shown in FIG. 4, it becomes clear that above mentioned catalyst can generate oxygen from aqueous solution of silver nitrate. As mentioned above, it is recognized that $Ta_3N_5$ has an ability to reduce proton to hydrogen and to oxidize water to oxygen by the visible light of longer wavelength than 420 nm. Further, in the case of irradiation of visible light of longer wavelength than 600 nm by passing through a wavelength filter which cuts off the visible light of shorter wavelength than 600 nm, the same results to the above mentioned case is obtained. In the meanwhile, in the case when visible light of longer wavelength than 700 nm is irradiated, by passing through a wavelength filter which cuts off the visible light of shorter wavelength than 700 nm, the generation of hydrogen or oxygen is not observed. Thus, calcined mixture powder containing $Ta_3N_5$ material is synthesized.

Example 2

The mixture of calcined mixture powder containing $Ta_2O_5$ (1.00 g) powder and lanthanum oxide $La_2O_3$ (0.74 g) powder is heated to 850° C. (1123K) by 10K/minute temperature elevating rate and maintain this temperature for 2.5–20 hours under the ammonia $NH_3$ gas flow rate of 1 $dm^3$/min., then quenched to the room temperature under He gas flow. Pt, which is a promoter, is added according to following process. That is, aqueous solution of tetraamminedichloroplatinum $Pt(NH_3)_4Cl_2$ is impregnated into obtained $Ta_3N_5$ material on a water bath and water is evaporated. Then reduced by hydrogen gas at 300° C. (573K) for 2 hours. The impregnating amount of the promoter can be altered within the limit of 0.1–10 wt. %.

X-ray diffraction patterns of the oxide powder mixture after calcined in ammonia for 2.5, 5, 10, 15 and 20 hours are shown in FIG. 7. The diffraction peaks in FIG. 7 are assigned to those of $Ta_3N_5$ (X), $La_2O_3$ (O) and $La(OH)_3$, and the generation of rhombic $Ta_3N_5$ is recognized. That is, it is recognized that the obtained product is a product containing at least rhombic $Ta_3N_5$. The U.V..visible light diffuse reflectance spectrum of said material is measured, and the results indicate that said material absorbs the visible light of shorter wavelength light than 620 nm likely to Example 1. In FIG. 8, hydrogen and oxygen evolution rate obtained in each nitriding calcinating time of above mentioned material. The generation of hydrogen is carried out by suspending 0.2 g of photocatalyst prepared by loading 1 wt. % of Pt promoter on the material containing $Ta_3N_5$ obtained by above mentioned nitriding and calcinating process and by irradiating the visible light. In the meanwhile, the generation of oxygen is carried out by suspending 0.2 g of above mentioned photocatalyst into 0.200 $dm^3$ of aqueous solution of 0.01 N $AgNO_3$, and irradiating visible light. As the light source, 500W xenon lamp is used, and the reactor was irradiated with the visible light (wavelength longer than 420 nm), using a wavelength cut-off filter. As shown in FIG. 8, it is understood that the above catalyst containing $Ta_3N_5$ can generate hydrogen and oxygen by irradiation of visible light of longer wavelength than 420 nm. Further, from FIG. 8, it is understood that above mentioned mixture indicates strong activity to the photo oxidization of water by nitriding calcinating from 5 hours to 20 hours under the ammonia gas flow. As mentioned above, the metal oxide containing $Ta_3N_5$ is recognized to have an ability to reduce a proton to hydrogen and oxidize water to oxygen by visible light having longer wavelength than 420 nm. Still more, by passing through a wavelength filter which cuts off the light of shorter wavelength than 600 nm, the same results to the above mentioned case is obtained in the case of irradiation of visible light of longer wave length of longer than 600 nm. Furthermore, in the case when visible light of longer wavelength than 700 nm is irradiated, even if the light is passed through a wavelength filter which cuts off the visible light of shorter wavelength than 700 nm, the generation of hydrogen or oxygen is not observed.

Control Example 1

In this Control Example, tantalum oxide on the market is used. Platinum, which is the promoter, is added by impregnating tetraamminedichloroplatinum $Pt(NH_3)_4Cl_2$ on a water bath and by evaporating water. The obtained product is reduced by hydrogen for 2 hours at 300° C. (573K). The impregnating amount of the promoter can be altered in the limit of 0.1–5 wt. %.

The X-ray diffraction of calcined material is shown in FIG. 5. All diffraction peaks in FIG. 5 are almost belonging to $Ta_2O_5$ and the generation of $Ta_2O_5$ is recognized. The U.V..visible light diffuse reflectance spectrum of said material is shown in FIG. 6. From FIG. 6, it is understood that the above material absorbs the U.V. light of shorter wavelength than 270 nm. When the reaction is carried out by irradiation of visible light like to the Examples, the generation of $H_2$ and $O_2$ are not observed.

From the above mentioned results, $Ta_3N_5$ prepared by replacing all oxygen of $Ta_2O_5$ to nitrogen is recognized to have an ability to reduce a proton to hydrogen and oxidize water to oxygen by visible light having longer wavelength than 420 nm.

INDUSTRIAL APPLICABILITY

As mentioned above, the photocatalyst obtained by the present invention, is the catalyst that acts by visible light, which is the majority in sun light, reaching to the surface of the earth. By carrying out photocatalyst reaction with sun light, the useful compound can be produced. Further, as indicated in Examples, since said photocatalyst has an ability to decompose water to hydrogen and oxygen by visible radiation, it is hopeful to be used as a photocatalyst convert sun light to hydrogen which is considered as the energy of next generation. In this connection, the ratio of U.V. light to the whole sun light is approximately 5%, and it is obvious that the use of visible light is remarkably effective.

What is claimed is:

1. A photocatalyst which contains at least rhombic tantalum nitride.

2. The photocatalyst containing at least rhombic tantalum nitride of claim 1, wherein said photocatalyst loads a promoter composed of transition metal.

3. The photocatalyst containing at least rhombic tantalum nitride of claim 2, wherein the promoter is platinum.

4. A photocatalyst comprising rhombic tantalum nitride.

5. The photocatalyst comprising rhombic tantalum nitride of claim 4, wherein said photocatalyst loads a promoter composed of transition metal.

6. The photocatalyst comprising rhombic tantalum nitride of claim 5, wherein the promoter is platinum.

* * * * *